Oct. 15, 1946.  R. I. MARKEY  2,409,576
JOINT BAND FOR EXHAUST MANIFOLD SYSTEMS
Filed Oct. 28, 1944
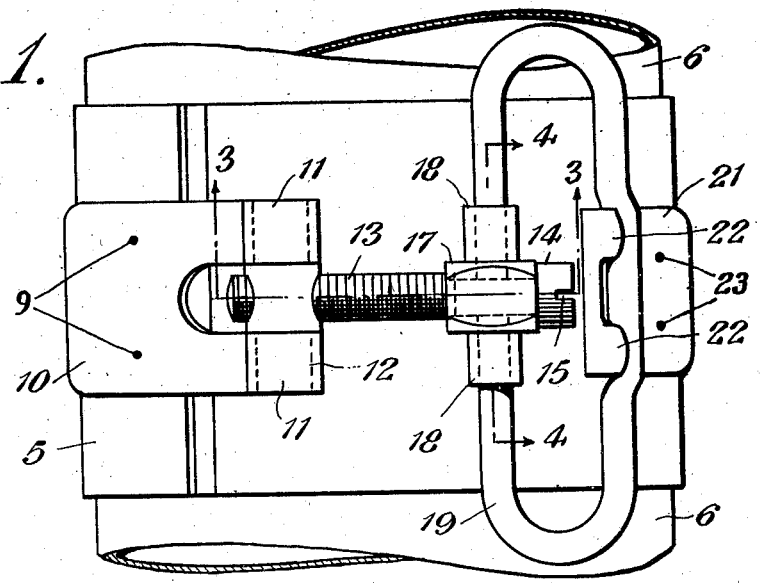
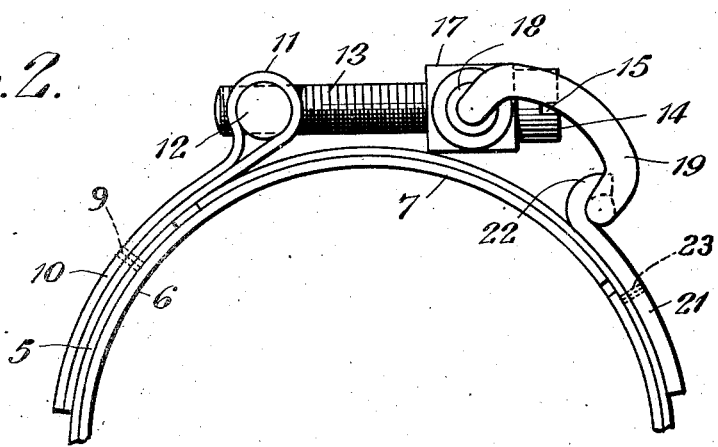
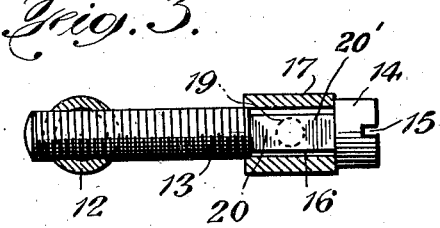
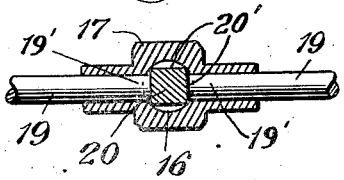
INVENTOR
Roscoe I. Markey
BY Geo. A. Senior
ATTORNEY Patented Oct. 15, 1946

2,409,576

UNITED STATES PATENT OFFICE 2,409,576

JOINT BAND FOR EXHAUST MANIFOLD SYSTEMS

Roscoe I. Markey, Montclair, N. J., assignor to Pollak Manufacturing Company, Arlington, N. J., a corporation of New Jersey Application October 28, 1944, Serial No. 560,871

4 Claims. (Cl. 24—19)

1

The invention relates to an exhaust manifold system or other pipe systems used where extreme variations in temperature occur or large amounts of vibration are encountered, and has to do particularly with the means for securing the ends of a split clamping member forming the joint or a part thereof together.

The invention is particularly applicable to joints of the type disclosed in my prior patents, 2,323,823, dated July 6, 1943; 2,226,936, dated December 31, 1940; 2,279,090, dated April 7, 1942; and my pending application Serial No. 546,531, filed July 25, 1944, now Patent Number 2,390,801, dated December 11, 1945. In all of those patents and in the pending application a resilient ring-like locking member is pivoted to one end of the split clamping member. This locking ring takes over and engages a hook member secured to the other end of the split clamping member when the parts are in their locked position, and due to its shape and resiliency permits of expansion and contraction of the parts.

It is essential that the locking ring exerts ample pressure to positively secure the clamp in its locked position. It has been found in practice that the strain imposed upon the locking ring in moving it from its open to closed position and vice versa often causes the locking ring to be over stressed or stretched beyond its elastic limit and when it is sprung into its locked position it will not exert sufficient pressure to tightly hold the parts together, thus frustrating the entire object of the invention.

The principal object of the present invention is to provide a connection between the ends of the split clamping member whereby all excessive strains on the locking ring are relieved when it is being latched or unlatched thereby doing away with the possibility of the ring ever being stretched beyond elastic limit and thus insuring long life to the joint and a tight joint at all times.

It will be understood the foregoing general description and the following detailed description are exemplary and explanatory of the invention but are not restrictive thereof. Other objects and advantages of the invention will become apparent as this specification proceeds.

Attention is hereby directed to the drawing in which a preferred embodiment of the invention is illustrated and in which Fig. 1 is a top plan view;

Fig. 2 is a fragmentary edge view; and

Figs. 3 and 4 are fragmentary detail sectional views taken on the lines 3—3 and 4—4 respectively of Fig. 1.

2

Referring again to the drawing the reference numeral 5 designates a split clamping member and 6—6 a pair of pipes or tubes to be connected together. A split liner 7 may be utilized as in my prior patents, 2,323,823 and 2,226,936 and the aforesaid mentioned pending application. In the construction disclosed in Patent No. 2,279,090 where the clamping member functions purely as a supporting member the use of the liner is not necessary.

As in my prior patent means are provided for firmly securing the ends of the split clamping member together, this means having particularly in mind to permit of diametrical expansion and contraction of the clamping member to compensate for changes in dimensions of the parts due to heating and cooling.

Secured to one end of the split clamping member by resistance welding 9 or other suitable means is a strap 10. The strap 10 is turned back on itself and is bifurcated to form a pair of eyes 11—11 in which a pivot pin 12 is mounted. The ends of the pivot pin are turned down to fit the eyes 11 and the enlarged central portion is threaded to accommodate a threaded cap screw 13 which has the usual head 14 with its kerf 15.

The top screw 13 passes freely through an opening 16 in a block 17 with its head 14 resting against the right hand side of the block as viewed from Figs. 1 and 2. Formed integral with the block 17 and at right angles to the cap screw is a pair of sleeves 18 which function as sockets for the ends of the locking member 19.

The portion 20 of the cap screw resting in the opening 16 and adjacent the head 14 is provided with a plurality of flats 20'. As illustrated, see Fig. 4, the portion 20 is square in cross-section. The free ends 19' of the locking member 19 engage the squared portion with a certain amount of pressure so that after the cap screw has been adjusted to its proper position it will be held from rotation due to vibration. The inherent resiliency of the locking member will permit of the cap screw being manipulated.

Secured by resistance welding 23 or other means to the other end of the split clamping member is another strap or plate 21 having a pair of ears 22 behind which the locking member rests when the parts are in their locked position as shown in Figs. 1 and 2.

When the parts are in their locked position, a substantial amount of pressure is set up in the resilient locking member to maintain the parts in that condition. When it is desired to release the clamping ring a special tool must be employed to spring the locking member over the ears 22. In doing this excessive strains are put on the locking member and it may be stretched beyond its elastic limit in which case the joint will become useless. Obviously the same thing occurs when the clamping member is being locked.

In accordance with the present invention when it is desired to release the clamping member 5 a screw driver is inserted in the kerf 15 of the cap screw 13 and the cap screw is manipulated to relieve some or all of the pressure set up in the locking member. The locking ring may then be flipped to its release position either by hand or with the screw driver. Thus all excessive strains on the locking member are eliminated as is also the use of a special tool. Obviously the same holds true when moving the locking ring from its unlatched to the latched position.

Changes in details of construction such as would occur to one skilled in the art are to be considered as coming within the spirit of the invention as set forth in the appended claims.

I claim:

1. In a device of the character described, the combination of a split clamping member having its ends slightly spaced apart when in assembled position, a cap screw pivotally mounted on one end of said split clamping member, a resilient ring-like locking member carried by said cap screw, ears carried by the other end of said split clamping member and over which said locking member takes when the parts are in their locked position, the rotation of said cap screw being adapted to relieve excessive pressure on the locking ring when the parts are moved from the locked position to the release position or vice versa, and means for preventing normal rotation of said cap screw.

2. In a device of the character described, the combination of a split clamping member having its ends slightly spaced apart when in assembled position, a pivot pin mounted on one end of said split clamping member, a cap screw threaded into said pivot pin, a resilient ring-like locking member carried by said cap screw, ears carried by the other end of said split clamping member and over which said locking member takes when the parts are in their locked position, the rotation of said cap screw being adapted to relieve excessive pressure on the locking ring when the parts are moved from the locked position to the release position or vice versa, and means whereby said locking ring will engage said cap screw to prevent normal rotation of said cap screw.

3. In a device of the character described, the combination of a split clamping member having its ends slightly spaced apart when in assembled position, a pivot pin mounted on one end of said clamping member, a cap screw threaded into said pivot pin, a block through which said cap screw freely passes, a resilient ring-like locking member having its ends mounted in said block, ears carried by the other end of said split clamping member and over which said locking member takes when the parts are in their locked position, the rotation of said cap screw being adapted to relieve excessive pressure on the locking ring when the parts are moved from the locked position to the release position or vice versa.

4. In a device of the character described, the combination of a split clamping member, a pivot pin mounted on one end of said split clamping member, a cap screw threaded into said pivot pin, flats on said cap screw adjacent the head thereof, a block through which said cap screw freely passes, a resilient ring-like locking member having its ends mounted in said block, and ears carried by the other end of said split clamping member and over which said locking member rests when the parts are in their locked position, the rotation of said cap screw being adapted to relieve excessive pressure on the locking ring when the parts are moved from the locked position to the release position or vice versa, and the ends of said locking ring engaging said flats on said cap screw to prevent normal rotation of said cap screw.

ROSCOE I. MARKEY.